(No Model.)
E. M. BENTLEY.
SYSTEM OF ELECTRICAL DISTRIBUTION.
No. 430,060. Patented June 10, 1890.
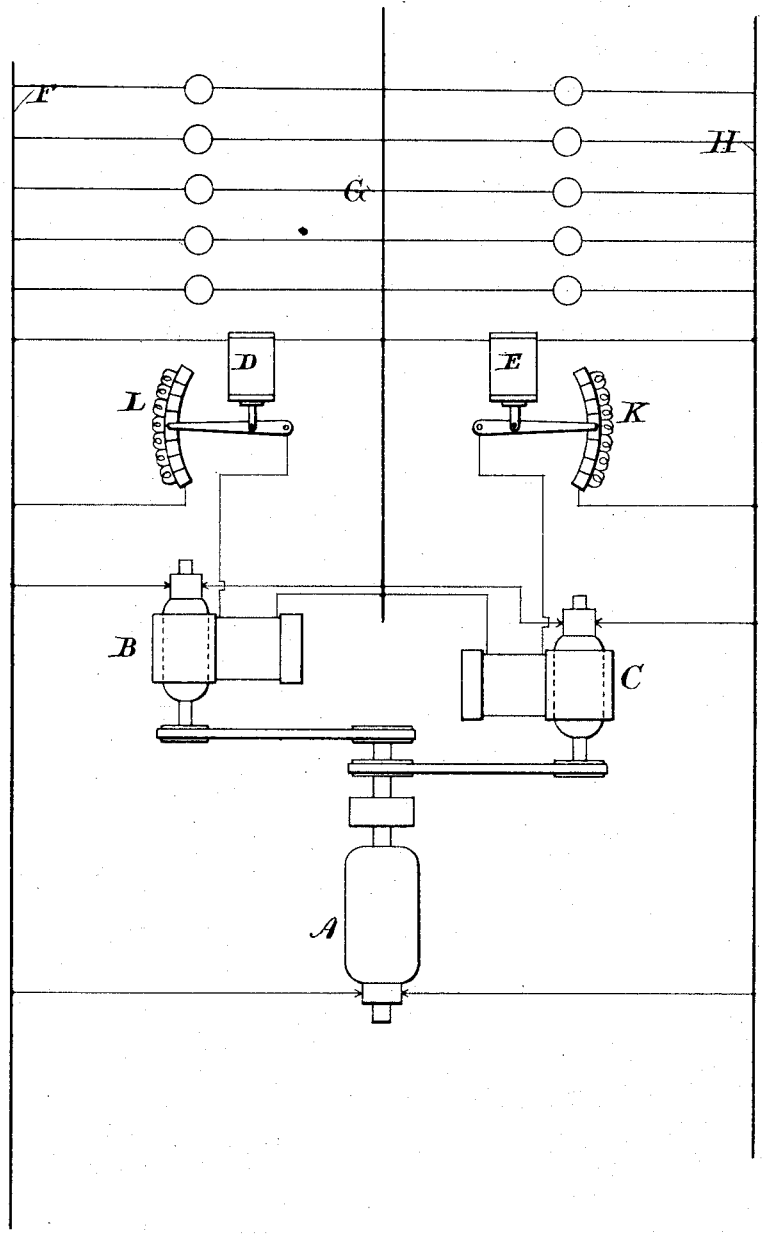
WITNESSES:
INVENTOR:
Edward M. Bentley
by Bentley & Knight
ATTYS.

UNITED STATES PATENT OFFICE.

EDWARD M. BENTLEY, OF BOSTON, MASSACHUSETTS, ASSIGNOR TO THE THOMSON-HOUSTON ELECTRIC COMPANY, OF CONNECTICUT.

SYSTEM OF ELECTRICAL DISTRIBUTION.

SPECIFICATION forming part of Letters Patent No. 430,060, dated June 10, 1890.

Application filed April 2, 1890. Serial No. 346,355. (No model.)

*To all whom it may concern:*

Be it known that I, EDWARD M. BENTLEY, a citizen of the United States, residing at Boston, in the county of Suffolk and State of Massachusetts, have invented certain new and useful Improvements in Systems of Electric Distribution, of which the following is a specification.

My invention relates to a system of electric distribution by which two or more groups of translating devices—such as incandescent lamps—may be operated in series and at the same time be independent of one another, so that the number of devices in each group may be varied at will without having any effect upon the devices in another group. It is illustrated in the accompanying drawings; and it consists, in general, of means whereby, upon the occurrence of any variation in the number of lamps in one group, the surplus current which is not used by the smaller group may be employed to assist the main generator.

In devices heretofore employed it has been proposed to bring a compensating wire from a point intermediate between the two groups back to the center of a divided source of electricity, so that there would be produced for each side of the circuit an amount of current corresponding to the number of devices in circuit. It has also been proposed, by means of a compensating device, to transfer the surplus current from the lighter to the heavier side of the circuit.

Referring to the accompanying drawing, A represents a main generator, from which extend two line-conductors F and H. I provide a third line-conductor G, extending from the central station and between the line G, and each of the lines F and H are included groups of incandescent lamps. It will be plain that so long as the lamps of the two groups are equal in number, there will no difficulty in the operation of the system. When, however, the lamps in one group are diminished, it will be necessary either to reduce the current upon the corresponding side of the circuit, or, as in my device, provide means—such as an electric motor—by which the surplus current may be utilized to assist the main generator. I provide an electric motor upon each side of the circuit, as at B and C. These motors are provided with a regulating-resistance for their field-magnets, which is controlled by an electro-magnet included in multiple arc with the lamp upon the corresponding side of the circuit. Thus the field-magnet of motor C will be included in the circuit between G and H, and in the field-magnet circuit will be included a resistance K, controlled by a solenoid E. So long as the circuit is in its normal position, with the groups equal, no current, or, at most, a constant current of small amount, will be passing through the solenoid E, and in this condition the resistance K will be so small that a considerable field strength will be given to the motor C and its counter electro-motive force will be so nearly equal to that of the direct electro-motive force that substantially no current will be consumed. When, however, a number of the lamps are cut out of the circuit, the potential between G and H will tend to rise and consequently increase the strength of E. This will cause a larger portion of resistance K to come into the circuit and thus weaken the strength of the field magnet of motor C. This will cause the motor, which must have constant speed corresponding to that of the generator A to consume energy equal to the surplus caused by the withdrawing of a number of lights from the circuit. The energy consumed by the motor C will, however, be conveyed to the generator A by means of proper belting and the energy ultilized to assist the engine in driving the generator A. By this means the current flowing through the generator A will be substantially a constant current; but any excess of what is demanded by the lamps in circuit will be practically returned through the motors B and C, which assist in driving the main generator.

By my invention, instead of two generators of small capacity, I use a single generator of double the capacity, by which a gain in efficiency is made, and the motors B and C need be but comparatively small ones, in order to take up the excess on either side of the circuit.

What I claim as new, and desire to secure by Letters Patent, is—

1. The combination, in an electric circuit, of a group of translating devices in multiple arc with one another, but in series with a second similar group, and a translating device in multiple arc with one of the groups adapted to transfer the surplus energy to the main machine.

2. The combination, with a multiple-arc group of translating devices in series with a similar group, of an electric motor in circuit with one of the groups and connected with the main generator to assist in driving the same.

3. The combination, with two or more multiple-arc groups of translating devices in series upon the same circuit, of an electric motor in circuit with each group connected to the main generator and provided with controlling devices also in circuit with the said groups respectively, whereby the said motor may be governed in accordance with the number of translating devices in each group.

4. The combination, with two or more multiple-arc groups of translating devices in series with each other on an electric circuit, of a motor in circuit with each group mechanically connected to the main generator, a field-magnet circuit for each motor, a resistance therein, and a controlling-magnet or solenoid for the said resistance included in multiple arc with each group, respectively.

5. The combination, with a multiple-arc group of translating devices in series with a similar group, of an electric motor in circuit with the said group having its armature-circuit and its field-magnet circuit in multiple arc, and provided with a mechanical connection to the main generator, a resistance in the field-magnet circuit of the said motor, and a controlling-magnet in multiple arc with the said group.

Signed this 26th day of March, 1890.

EDWARD M. BENTLEY.

In presence of—
  A. O. ORNE,
  F. O. BLACKWELL.